(12) United States Patent
Hakobyan et al.

(10) Patent No.: US 12,282,088 B2
(45) Date of Patent: Apr. 22, 2025

(54) SA RADAR SENSOR FOR MOTOR VEHICLES

(71) Applicant: Robert Bosch GmbH, Stuttgart (DE)

(72) Inventors: Gor Hakobyan, Schoenaich (DE); Johannes Fink, Karlsruhe (DE)

(73) Assignee: ROBERT BOSCH GMBH, Stuttgart (DE)

(*) Notice: Subject to any disclaimer, the term of this patent is extended or adjusted under 35 U.S.C. 154(b) by 401 days.

(21) Appl. No.: 17/844,830

(22) Filed: Jun. 21, 2022

(65) Prior Publication Data

US 2023/0003873 A1 Jan. 5, 2023

(30) Foreign Application Priority Data

Jul. 5, 2021 (DE) .................... 10 2021 207 032.9

(51) Int. Cl.
*G01S 13/90* (2006.01)
*G01S 13/931* (2020.01)

(52) U.S. Cl.
CPC ........ *G01S 13/9021* (2019.05); *G01S 13/931* (2013.01)

(58) Field of Classification Search
CPC .... G01S 13/931; G01S 13/9011; G01S 7/356; G01S 7/2883
USPC ................................. 342/195, 196, 179, 192
See application file for complete search history.

(56) References Cited

U.S. PATENT DOCUMENTS

| | | | | |
|---|---|---|---|---|
| 4,016,567 A | * | 4/1977 | Buss ....................... | G01S 13/64 708/820 |
| 4,152,649 A | * | 5/1979 | Choquet ........... | H04L 25/03038 708/305 |
| 4,446,521 A | * | 5/1984 | Inouye .................. | G06T 11/006 382/280 |
| 4,471,357 A | * | 9/1984 | Wu ...................... | G01S 13/9011 342/25 D |
| 4,876,549 A | * | 10/1989 | Masheff .................... | G01S 3/46 342/194 |
| 4,931,977 A | * | 6/1990 | Klemes ................. | G01S 7/2813 702/195 |
| 6,131,071 A | * | 10/2000 | Partyka .................... | G01V 1/32 702/16 |

(Continued)

*Primary Examiner* — Ladimir Magloire
*Assistant Examiner* — Michael W Justice
(74) *Attorney, Agent, or Firm* — NORTON ROSE FULBRIGHT US LLP; Gerard A. Messina

(57) ABSTRACT

Radar sensor for motor vehicles. The radar sensor has a high-frequency part, which is configured to transmit sequences of modulated radar pulses and to receive the corresponding radar echoes, and an electronic evaluation part, which is configured to take distance and angle measurements using a synthetic aperture, and includes a scanning module, an FFT module for performing fast Fourier transforms to calculating a two-dimensional distance/velocity radar image, a transform module configured to transform the raw data, while simultaneously correcting migration effects, into a format that can be processed by the FFT module, by applying a transform function defined by a number N of coefficients, and a coefficient module for preparing the coefficients for the transform module. The coefficient module including a memory, in which there is stored an initial set of coefficients comprising fewer than N coefficients, and a recursion module, for recursive calculation of the remaining coefficients.

9 Claims, 3 Drawing Sheets

(56) References Cited

U.S. PATENT DOCUMENTS

| | | | |
|---|---|---|---|
| 6,400,782 B2* | 6/2002 | Tal | G06F 17/10 |
| | | | 375/350 |
| 8,812,571 B2* | 8/2014 | McGowan | H03H 17/0294 |
| | | | 708/300 |
| 9,065,519 B2* | 6/2015 | Cyzs | H04B 1/525 |
| 9,406,312 B2* | 8/2016 | Yamamoto | G10L 19/0208 |
| 9,679,580 B2* | 6/2017 | Yamamoto | G10L 19/0208 |
| 10,339,907 B2* | 7/2019 | Yokota | H03H 17/0213 |
| 10,613,193 B2* | 4/2020 | Kim | H04B 1/3805 |
| 10,768,328 B2* | 9/2020 | Nguyen | G01V 1/364 |
| 11,835,649 B2* | 12/2023 | Kim | G01S 7/417 |
| 11,852,750 B2* | 12/2023 | Kim | G01S 7/417 |
| 2001/0032225 A1* | 10/2001 | Tal | G06F 17/10 |
| | | | 708/315 |
| 2002/0029234 A1* | 3/2002 | Takaoka | G06F 17/141 |
| | | | 708/405 |
| 2008/0191932 A1* | 8/2008 | Hemming | G01S 19/30 |
| | | | 375/E1.003 |
| 2010/0046599 A1* | 2/2010 | Kim | H04L 25/03057 |
| | | | 375/233 |
| 2012/0290633 A1* | 11/2012 | McGowan | H03H 17/0294 |
| | | | 708/322 |
| 2013/0028427 A1* | 1/2013 | Yamamoto | G10L 21/038 |
| | | | 381/22 |
| 2013/0102254 A1* | 4/2013 | Cyzs | H04B 1/10 |
| | | | 455/63.1 |
| 2016/0140982 A1* | 5/2016 | Yamamoto | G10L 21/038 |
| | | | 704/500 |
| 2016/0370484 A1* | 12/2016 | Cotton | G01V 1/308 |
| 2018/0031673 A1* | 2/2018 | Kim | H04B 1/04 |
| 2018/0196155 A1* | 7/2018 | Nguyen | G01V 1/282 |
| 2018/0268794 A1* | 9/2018 | Yokota | H03H 17/06 |
| 2020/0304144 A1* | 9/2020 | Milot | G06F 17/15 |
| 2020/0408880 A1* | 12/2020 | Kim | G01S 7/417 |
| 2020/0408881 A1* | 12/2020 | Kim | G01S 13/345 |
| 2021/0156981 A1* | 5/2021 | Stettiner | G01S 13/931 |
| 2021/0194499 A1* | 6/2021 | Milot | G06F 17/15 |

* cited by examiner ized to transmit sequences of modulated radar pulses and to receive the corresponding radar echoes, and an electronic evaluation part, which is configured to take distance and angle measurements by the principle of the synthetic aperture (SA), and which features:
SA RADAR SENSOR FOR MOTOR VEHICLES

CROSS REFERENCE

The present application claims the benefit under 35 U.S.C. § 119 of German Patent Application No. DE 10 2021 207 032.9 filed on Jul. 5, 2021, which is expressly incorporated herein by reference in its entirety.

FIELD

The present invention relates to a radar sensor for motor vehicles, having a high-frequency part, which is configured to transmit sequences of modulated radar pulses and to receive the corresponding radar echoes, and an electronic evaluation part, which is configured to take distance and angle measurements by the principle of the synthetic aperture (SA), and which features:
- a scanning module, which is configured to scan the amplitudes of the received radar echoes as raw data in a two-dimensional data space, in which one dimension represents the change in the amplitudes over time within a radar pulse, and the other dimension represents the change in amplitudes from pulse to pulse,
- an FFT module with specialized hardware for performing fast Fourier transforms (FFTs) for the purpose of calculating a two-dimensional distance/velocity radar image,
- a transform module, which is configured to transform the raw data, while simultaneously correcting migration effects, into a format that can be processed by the FFT module, by applying a transform function defined by a number N of coefficients, and
- a coefficient module for preparing the coefficients for the transform module.

BACKGROUND INFORMATION

Radar systems for measuring the distances, relative velocities and angles of objects (such as vehicles and obstacles) are increasingly being used in motor vehicles for safety and comfort functions. The use of radar sensors with a synthetic aperture (SA) has been the subject of study in the automotive sector for some years. The principle of the synthetic aperture allows particularly accurate angle measurements to be taken as the radar sensor itself moves, in that the measurements at different localities are interpreted as a synthetic antenna aperture (antenna surface) and processed accordingly. The synthetic aperture is produced as a result of the fact that, because the radar is itself moving, the transmitting and receiving antennas are at different localities at the time of each individual measurement, and can thus be processed mathematically as though there were a large antenna aperture along the trajectory of travel. In this way, with individual transmitting and receiving antennas, resolutions in the angle measurement become possible that would be unachievable with the antenna aperture that is actually present.

Typically, today's radar systems in motor vehicles make use of fast-chirp FMCW modulation, in which a plurality of linear frequency ramps (frequency-modulated pulses) of the same gradient are successively transmitted. Mixing the signal transmitted at that moment with the received signal produces a low-frequency signal (called a beat frequency) of which the frequency is proportional to the distance. Typically, the system is configured such that the proportion of the beat frequency that is caused by the Doppler shift on radial relative movement of the object is negligible. In that case, the distance information obtained is largely unambiguous. The Doppler shift—and hence the radial velocity—may then be determined by observing the development over time of the phase of the complex distance signal over the ramps. The distance and velocity are determined independently of one another, typically with the aid of two-dimensional fast Fourier transform (FFT).

It is also possible to use the measurement principle of fast-chirp modulation with an SA radar. Distance evaluation remains largely unchanged. The Doppler evaluation over the ramps is in this case replaced by an SA evaluation. The end result is not a Doppler measurement but, assuming stationary targets and with a knowledge of the movement of the vehicle itself, an angle measurement. For this purpose, the relative velocity, resulting from the Doppler measurement, of the object is evaluated and is a projection of relative movement along the visual axis in relation to the object.

Although, for data evaluation by the principle of the synthetic aperture, a movement of the vehicle itself is required so that a synthetic aperture is indeed produced, the calculation of the distance/velocity radar image is made more difficult by the fact that, as a result of the vehicle itself moving, the stationary objects of which the angles are to be measured are subject to an apparent change in location (migration) during the period of the measurement cycle, and this results in distortions in the radar image.

A number of algorithms are described in the related art by which migration effects of this kind are corrected. A conceptual distinction may be made here between two categories of algorithm: (a) algorithms which are able to process any synthetic aperture (e.g. back projection), but require relatively great processing effort; and (b) others, which are limited to a particular aperture type (e.g. linear) but in return are more processing-efficient (such as the Keystone algorithm). In this context, efficient calculation of the distance/velocity radar image and the resulting distance/angle radar image is highly important in the automotive application, because real-time processing is required.

In order to achieve a high level of processing efficiency and hence real-time processing, accelerators for the FFT operations are used in conventional motor vehicle radar sensors. For example, the kernel of the Keystone algorithm is a so-called chirp z-transform, which may be regarded as a convolution of two functions for the calculation of which FFT accelerators may likewise be used. For this, the coefficients of the chirp z-transform that are involved in the rapid convolution either have to be calculated in advance and written to a memory, or calculated online. The former approach takes additional memory, while the latter approach requires complex exponential calculations in real time.

SUMMARY

An object of the present invention is to provide a radar sensor that needs only a small amount of memory space for storing the coefficients of the transform function, but with which it is still possible to provide the coefficients that are needed for real-time processing of the radar image fast enough.

The object may be achieved according to the present invention in that the coefficient module features:
- a memory, in which there is stored an initial set of coefficients comprising fewer than N coefficients, and
- a recursion module, for recursive calculation of the remaining coefficients.

The present invention utilizes the fact that the coefficients required for the transform function can be calculated recursively. Because the raw data to which the transform is applied is defined in a two-dimensional data space, the transform function is also defined on a two-dimensional space, and its coefficients c(n, k) are consequently functions having two indices, n and k. Thus, it is possible for example to store as the initial set the coefficients c(0, k) and to calculate the remaining coefficients c(n, k) where n>0 using a recursive formula c(n, k)=f(c(n−1, k)). It is found that in this way the coefficients can be calculated significantly faster than with a conventional algorithm in which the coefficients for the index pairs (n, k) are calculated individually and independently of one another. In this way, the coefficients can successfully be provided as fast as they are needed for performing the transform in real time. If the number of coefficients n—that is to say the size of the data space in the first dimension—is designated $N_{fast}$, and the number of coefficients k in the second dimension is designated $N_{slow}$, then the memory space required for the coefficients in the method according to the present invention is not proportional to $N_{fast} \times N_{slow}$ but is only proportional to either $N_{fast}$ or $N_{slow}$. Because the numbers $N_{fast}$ and $N_{slow}$ have to be relatively large, for example 256 and 512 respectively, so that the SA evaluation can be performed sufficiently accurately, and moreover because the coefficients are complex numbers, the recursive calculation of the coefficients makes it possible to save on a considerable amount of memory space.

The present invention is not limited to data evaluation by the Keystone algorithm, but can be generally applied to all evaluation algorithms in which the coefficients of the transform function can be calculated recursively. Nor is the present invention limited to rapid-chirp FMCW radar, but is generally applicable to radar sensors in which the transmitted signal comprises modulated, for example phase-modulated, pulse sequences.

Advantageous embodiments and further developments of the present invention are disclosed herein.

If the raw data is transformed mathematically by a convolution, the specialized hardware for fast Fourier transforms in the radar sensor may also be used for calculating the transform defined by the coefficients, for example in that the raw data and also the transform function are transformed from the time domain into the frequency domain by FFT, the functions are then multiplied in the frequency domain and are then, using inverse FFT, transformed back into the time domain, before the two-dimensional Fourier transform is performed in the FFT module for the purpose of calculating the distance/velocity radar image.

The stored initial set of coefficients need not be an individual vector (with the indices n or k as components), but rather for example two or more such vectors may be stored. If $N_{fast}$ or $N_{slow}$ is very large, this has the advantage that the accumulation of rounding errors is suppressed, because the calculated coefficients then form a plurality of short recursive sequences, rather than a single very long sequence.

If the matrix of the coefficients n, k forms one or more blocks, it may also be favorable to start the recursion with a stored initial set of coefficients for a column or row in the center of the respective block, and then to progress through the block with two separate recursive sequences in opposing directions. This not only halves the length of recursive sequences and thus makes rounding errors smaller, but at the same time has the effect that relatively large rounding errors occur at most at the edges of the block, where the data is in any case scaled down by a window function, with the result that the errors have a less pronounced effect.

Exemplary embodiments are explained in more detail below, with reference to the figures.

DETAILED DESCRIPTION OF EXAMPLE EMBODIMENTS

Figure 1:
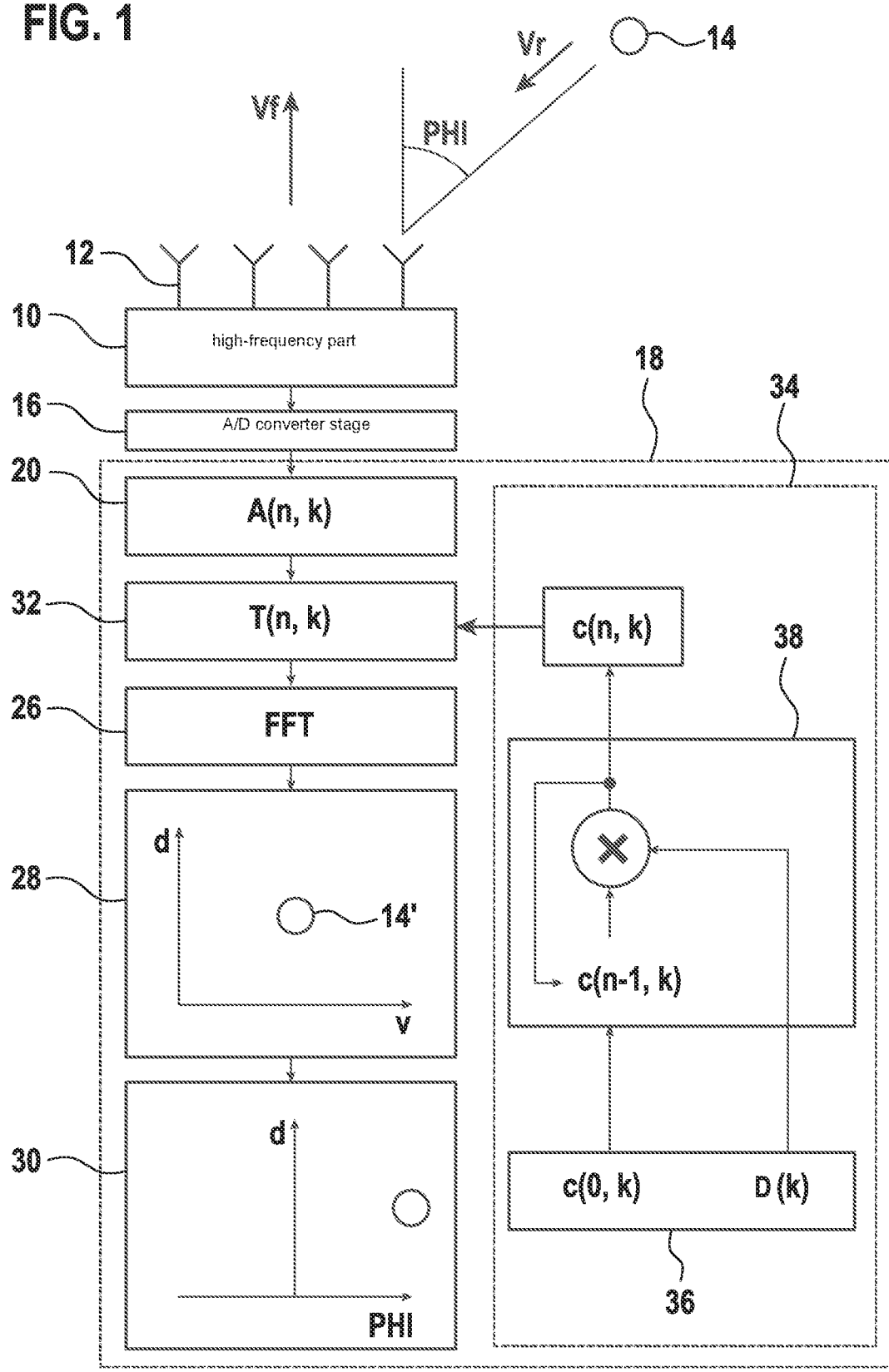
FIG. 1 shows a block diagram of an SA radar sensor according to the present invention.

The radar sensor shown in FIG. 1 features a high-frequency part 10, which is configured for example as a rapid-chirp FMCW radar and, in each measurement cycle, transmits a sequence of frequency-modulated radar pulses or ramps by way of an array of antennas 12. The radar signals that are reflected from objects 14 are received by antennas 12 again and, as is conventional in FMCW radar, are mixed with a proportion of the signal that is transmitted at the respective point in time, such that a beat signal of significantly reduced frequency (beat frequency) is obtained.

An analog-to-digital converter stage 16 forms an interface between high-frequency part 10 and an evaluation part 18. There, the digitalized complex amplitudes of the beat signal are scanned at regular time intervals and stored as a time signal. Data is stored in a two-dimensional data space—that is to say the amplitudes A(n, k) are stored as functions of a "fast" index n and a "slow" index k.

Figure 2:
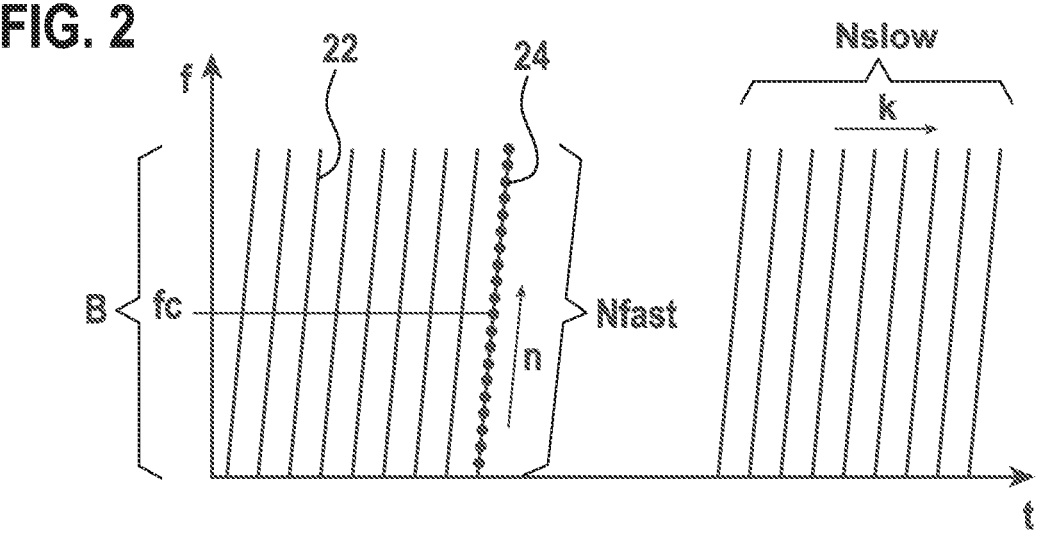
FIG. 2 shows a time diagram of a pulse sequence transmitted by the radar sensor.

In FIG. 2, frequency-modulated pulses 22 which are transmitted by the high-frequency part, and which are also designated as ramps or chirps, for two successive measurement cycles are illustrated schematically in a frequency/time diagram. Frequency f is entered on the vertical axis, and time t on the horizontal axis. Within each chirp, frequency f increases linearly. The center frequency of the pulses is designated fc, and the bandwidth is designated B. Fast index n counts successive scan time points 24 within an individual pulse 22, while slow index k counts the successive pulses within each measurement cycle. The number of scan time points 24 within each pulse is designated $N_{fast}$, and the number of pulses 22 within each measurement cycle is designated $N_{slow}$. In practice, however, the numbers in $N_{fast}$ and $N_{slow}$ are significantly greater than in the diagram, which has been simplified. Typical values are for example $N_{fast}$=256 and $N_{slow}$=512.

Moreover, evaluation part 18 (FIG. 1) features an FFT module 26 for fast Fourier transforms (FFTs). The hardware of this module is configured to perform discrete Fourier transforms particularly fast and efficiently. As is conventional in rapid-chirp FMCW radar, a one- or two-dimensional Fourier transform is performed in the FFT module, in which one dimension is the sequence of scan time points counted by index n.

In conventional rapid-chirp radar (without SA evaluation), amplitudes A(n, k) captured in the scan module are transmitted directly to the FFT module. The two-dimensional spectrum generated by the FFT module then represents a distance/velocity radar image 28, in which each object 14 is apparent in the radar echo as a peak 14' of which the location in the two-dimensional distance/velocity space indicates the distance d of the object and its relative velocity v. Because the frequency ramps of pulses 22 are very steep, the Doppler shift within a pulse that results from the relative movement of the objects is negligible, so the location of the peaks in the first dimension gives a good approximation to object distance d. Relative velocity v of the object results from the change in phases of the signals from pulse to pulse, measured in each case at the same scan time point, and is thus obtained by the Fourier transform in the second dimension.

In the case of the SA radar described here, however, objects 14 are not, or at least not primarily, vehicles that are moving forward and of which the distance and relative velocity is to be measured, but rather primarily stationary objects at the edge of the highway, of which the precise location (distance and angle) is to be measured. In FIG. 1, a vector Vf indicates the movement of the vehicle itself in which the radar sensor is installed, and thus also the movement of the radar sensor itself. The sight line from the radar sensor to object 14 forms an angle PHI with vector Vf (that is, the direction of travel). Because the radar sensor is itself moving, a radial velocity Vr=−Vf cos(PHI) is measured for object 14 even though the latter is stationary. By solving this equation for PHI, it is thus possible to convert the measured radial velocity Vr of object 14 into the directional angle PHI at which the object is seen, and consequently distance/velocity radar image 28 can also be interpreted as distance/angle radar image 30, it being possible to determine whether PHI is positive or negative (object to the right or left side of the vehicle) using the phase differences between the signals received by different antennas 12.

Because of the apparent change in location of object 14 over the period of a measurement cycle, however, migration effects occur, and these result in distortion of distance/velocity radar image 28. In order to correct this distortion, there is inserted between scan module 20 and FFT module 26 a transform module 32, which performs a transform that corrects the migration effects at the amplitudes A(n, k) captured in scan module 20 by a particular algorithm, for example the Keystone algorithm. Thus, the input data received by FFT module 26 does not directly comprise the amplitudes A(n, k), but transformed (migration-free) amplitudes T(n, k). Moreover, in transform module 32 the Fourier transform that is performed is already in the dimension corresponding to the sequence of pulses that are counted by index k.

The transform that corrects the migration effects is defined by a set of coefficients c(n, k), which for their part are a function of indices n and k.

In the case of the Keystone algorithm, for example:

$$c(n,k) = \exp(i(\pi k^2/N_{slow})(1+nB/(fc\ N_{fast}))) \qquad (1)$$

In principle, these coefficients c(n, k) only need to be calculated once for each index pair n, k in order then to be stored in a memory of evaluation part 18. However, memory space is then required for $N_{fast} \times N_{slow}$ complex coefficients (131,072 in the example shown). If the radar sensor has various operating modes which differ for example in respect of the center frequency fc (for example in order to avoid interference with the radar sensors of other vehicles), then the required memory space proliferates accordingly.

On the other hand, if each individual coefficient is calculated by the above-indicated formula as needed, then during each measurement cycle a high number of very complex calculations has to be performed, with the result that a computer with a high processing capacity is required.

However, from the above-indicated formula (1) it is possible to derive the following recursive formula:

$$c(n,k) = \exp(i(\pi/N_{slow})Bk^2/(N_{fast}fc))c(n-1,k) \qquad (2)$$
$$= D(k)c(n-1,k)$$

The constant D(k) only needs to be calculated once for each k and can then be stored. Moreover, if an initial set of coefficients $$c(0,k) = \exp(i\pi k^2/N_{slow})$$

is stored, then all the coefficients can be calculated recursively, only a simple multiplication needing to be performed for each increment of n and each value of the index k. The required memory space is significantly reduced, since memory space is now only needed for the $N_{slow}$ initial values c(0, k) and the constants D(k).

In this way, a favorable compromise is achieved between required memory and processing capacity, with the result that the overall costs for hardware can be significantly reduced.

As FIG. 1 shows, evaluation part 18 contains a coefficient module 34 that provides the coefficients c(n, k) for transform module 32. The coefficient module contains a memory 36, in which there is stored, for each of the $N_{slow}$ values of the index k, an initial value c(0, k) and the associated factor D(k), and a recursion module 38 for recursive calculation of the coefficients c(n, k) for n>0. Once recursion module 38 has calculated a set of coefficients c(n−1, k) and transmitted it to transform module 32, this set is also stored in a register of the recursion module and then used to calculate the next set of coefficients c(n, k).

Figure 3:
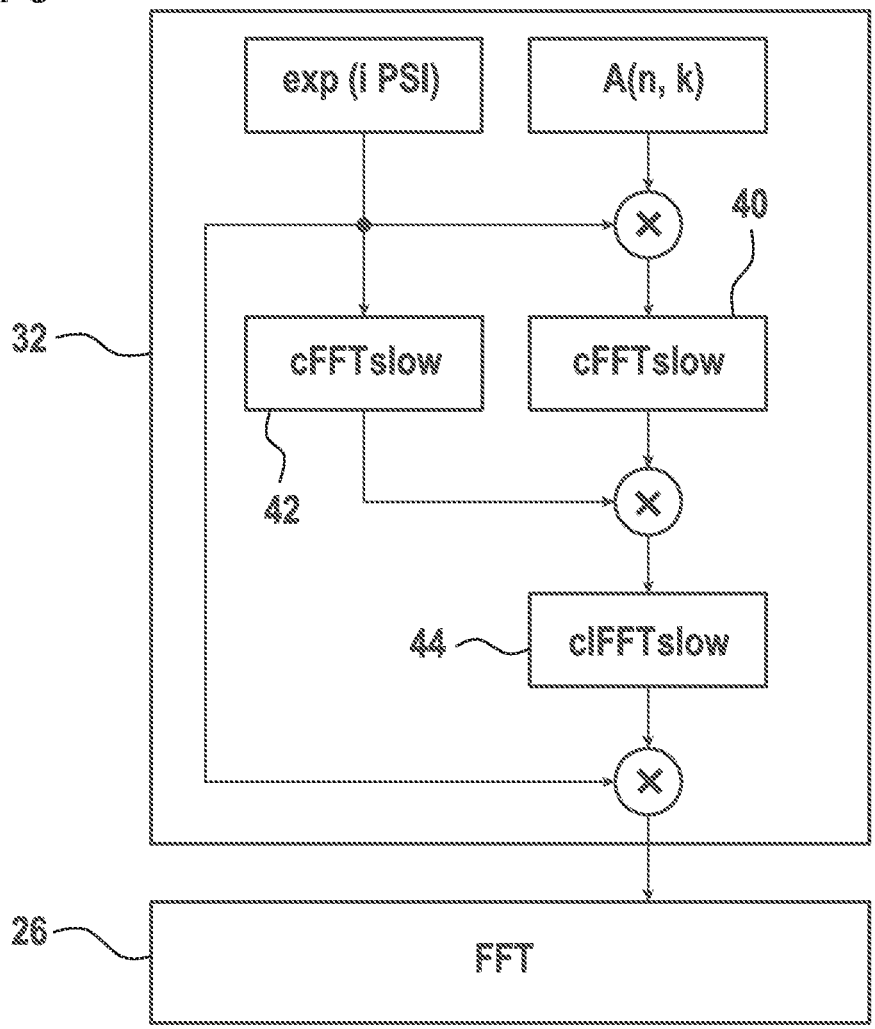
FIG. 3 shows a flow chart for a chirp z-transform.

Operation of transform module 32 is illustrated in more detail in FIG. 3. The complex amplitudes A(n, k) are functions of time, to be more precise of fast time (index n) and slow time (index k). Mathematically, the chirp z-transform is a convolution of this time-dependent function with a further time-dependent function, which may be expressed as a phase factor exp(iPSI) with a time-dependent phase PSI. Rather than performing this convolution directly by numerical integration, a mathematically equivalent operation is performed which has in its kernel a Fourier transform of both functions into the frequency domain, multiplication of the two frequency-dependent functions, and then inverse transform into the time domain. For this, first the complex amplitudes A(n, k) for each index pair are multiplied by the phase factor exp(iPSI), which is a function of these indices n and k. Then, in an FFT stage 40, the product undergoes a complex Fourier transform $cFFT_{slow}$ in the "slow" dimension (index k). In parallel with this, in a further FFT stage 42 the phase factor exp(iPSI) also undergoes the same Fourier transform. The functions that are transformed into the frequency domain are multiplied by one another and then, in a further FFT stage 44 with inverse Fourier transform $cIFFT_{slow}$, undergo inverse transform back into the time domain. The result is then multiplied once again, for each index pair n, k, by the phase factor exp(iPSI). The product of this provides the transformed amplitudes T(n, k) which are then transmitted, as input data, to FFT module 26 for the Fourier transform in the dimension specified by the index n.

The procedure shown in FIG. 3 has the advantage that the Fourier transforms in FFT stages 40, 42 and 44 can be performed very fast and efficiently with the aid of specialized hardware. Where necessary, the hardware of FFT module 32 may also be used for this purpose. The other operations that are to be executed in transform module 32 are simple multiplications, which can be carried out substantially faster than numerical convolution operations.

The multiplications by phase factor exp(iPSI) are performed in transform module 32 such that, first, for a fixed value of index n (for example n=0), the products are calculated for all values of index k, and this is then continued for the next highest value of index n. Coefficient module 34 can then supply the coefficients c(n, k) that are needed for calculation of the phase factors in the order in which they are needed for multiplication by the phase factor. In FFT stage 42, too, in each case integration is carried out with a fixed n over index k. The recursive calculation of the coefficients in coefficient module 34 thus need only be carried out once for each measurement cycle.

Figure 4:
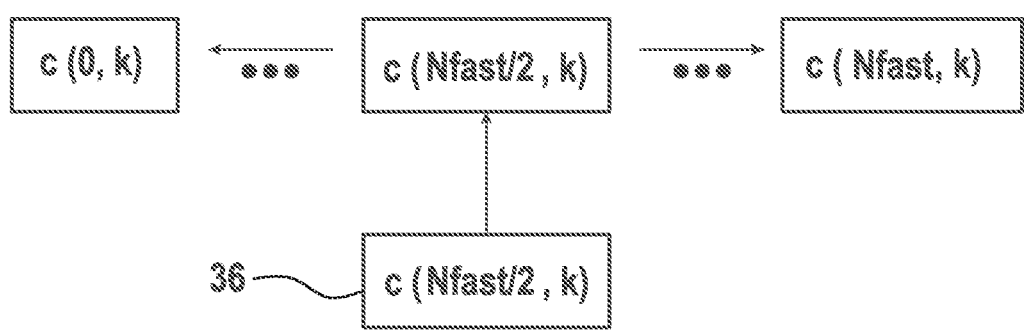
FIG. 4 shows a recursion scheme for calculating the coefficients of the chirp z-transform.

In principle, the calculations in transform module 32 for the different values of n may be carried out in any order. For this reason, it is not mandatory to start the recursion in coefficient module 34 with n=0. For example, it would also be possible to start with a value of n in the vicinity of $N_{fast}/2$, and then to continue with two recursive sequences to smaller values of n and larger values of n, as shown schematically in FIG. 4. This has the advantage on the one hand that each of the two recursive sequences is only half as long as the sequence from n=0 to n=$N_{fast}$. Because rounding errors, which are unavoidable in the calculation, tend to accumulate as recursion progresses, the fact that the recursive sequences are shortened has the effect of a smaller error accumulation.

A further advantage of this procedure results from the fact that the transformed amplitudes T(n, k) in FFT module 26 are typically multiplied using a window function, which suppresses the amplitudes at the edges of the relevant time interval (where n=0 and n=$N_{fast}$). This windowing serves to mitigate artifacts resulting from the fact that the transform can only be performed over a finite time interval. If, in addition, when calculating the coefficients the recursion progresses from the center to the edges of the time interval, this results in the advantage that the accumulated errors at the edges of the interval are also suppressed by the window function.

One way of further suppressing error accumulation is for the value range of the indices n to be divided into a plurality of blocks and for the recursion then to be performed in blocks, preferably once again progressing from the center to the edges, as a result of which the recursive sequences are further shortened.

Figure 5:
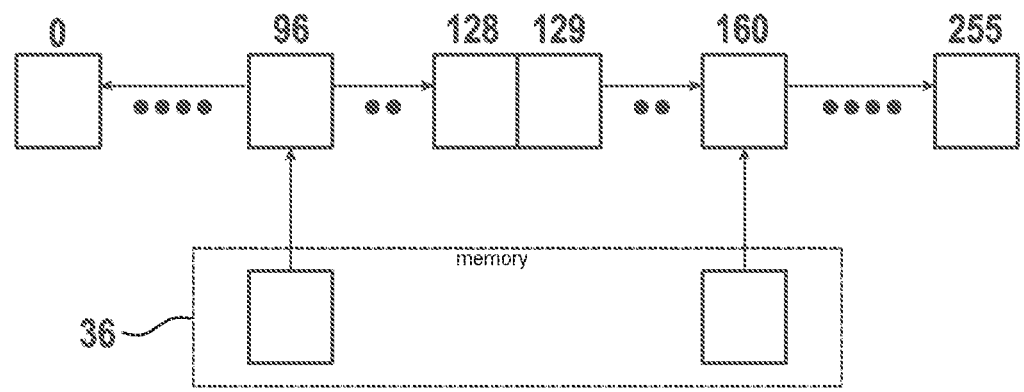
FIG. 5 shows an example of a modified recursion scheme.

FIG. 5 shows an example of a recursion scheme in which the value range for the index n (0-255) is divided into two blocks, which extend from 0-128 and from 129-255. In this case, two sets of initial coefficients c(96, k) and c(160, k) are stored in memory 36. The recursion then progresses from these initial values to the edges of the respective block. However, the initial values for n=96 and n=160 do not lie in the center of the respective block but are displaced toward the center of the entire value range. For this reason, the recursive sequences, which progress to n=128 and n=129 respectively, are shorter than the recursive sequences that progress to the outer edges n=0 and n=255. Thus, there is a smaller error accumulation in the center of the value range than at the outer edges, where the errors are additionally also suppressed by the windowing.

Moreover, the error may also be reduced in that, instead of the one set of constants D(k), a plurality of sets are stored, which are previously calculated exactly for different step sizes—that is to say different increments of the index n. For example, a set D_1(k) representing an increment of length 1 and an additional set D_10(k) representing increments of length 10 may be used, with the result that every tenth iteration can be calculated using D_10(k) and the iterations in between can be calculated using D_1(k). This also reduces the number of iterations by a factor of 10. The number of sets D_i(k) used, and their gradation, may in this case be selected as desired, and depends on the need for accuracy, the numerical representation and the available memory.

What is claimed is:

1. A synthetic aperture radar sensor for a motor vehicle, comprising:
a high-frequency part configured to transmit sequences of modulated radar pulses and to receive corresponding radar echoes;
an analog/digital converter, wherein the analog/digital converter is configured to convert the received radar echoes into digital data;
an FFT module;
a memory statically storing an initial set of coefficients, the initial set of coefficients forming a subset of a set of N coefficients, the initial set of coefficients consisting of fewer than the N coefficients; and
a processor system that includes one or more processors configured to perform the following during a drive of the motor vehicle:
use the digital data to generate a two-dimensional data space representing amplitudes of the received radar echoes, wherein a first dimension of the two-dimensional data space represents a change in the amplitudes over time within respective ones of the radar pulses, and a second dimension of the two-dimensional data space represents a change in amplitudes from pulse to pulse between the radar pulses;
dynamically complete the set of N coefficients by performing a recursive calculation based on a current operation state of at least one of the vehicle and the radar sensor and using the memory, thereby obtaining all remaining ones of the set of N coefficients other than the initial set;
apply a transform function defined with the obtained N coefficients to the raw data of the two-dimensional data space, thereby obtaining a transformed form of the data in which migration effects are corrected; and
use specialized hardware of the FFT module, to apply the transformed form of the data to fast Fourier transforms, thereby generating a two-dimensional distance/velocity radar image as distance and angle measurement output of the synthetic aperture radar sensor.

2. The radar sensor as recited in claim 1, wherein the N coefficients are functions of two integer indices n and k, and the initial set of coefficients corresponds to a fixed value of the index n and all values of the index k.

3. The radar sensor as recited in claim 2, wherein a value range of the index n is divided into a plurality of blocks, the initial set of coefficients includes respective an sub-initial sets of coefficients for each of these blocks, and the recursive calculation is performed a separately for each of the blocks.

4. The radar sensor as recited in claim 3, wherein the recursive calculation includes calculating, for or for each block, two recursive sequences, which start at a value of n within the block and progress in opposing directions to edges of the block.

5. The radar sensor as recited in claim 2, wherein the recursive calculation includes calculating, for the entire value range of the index n, two recursive sequences, which start at a value of n within the value range and progress in opposing directions to edges of the value range.

6. The radar sensor as recited in claim 2, wherein the processor system is configured to perform recursions of the recursive calculation with different increments of the index n.

7. The radar sensor as recited in claim 1, wherein the application of the transform function includes performing a convolution of two time-dependent functions in that the functions are transformed, with the aid of the specialized hardware of the FFT module, into frequency domain and there multiplied by one another, and a product is inverse transformed, once again using the specialized hardware of the FFT module, back into time domain.

8. The radar sensor as recited in claim 7, wherein the transform function is a chirp z-transform function.

9. The radar sensor as recited in claim 1, wherein the radar sensor is a rapid-chirp FMCW radar.

\* \* \* \* \*